(12) United States Patent
Takahashi

(10) Patent No.: US 8,599,257 B2
(45) Date of Patent: Dec. 3, 2013

(54) VEHICLE DETECTION DEVICE, VEHICLE DETECTION METHOD, AND VEHICLE DETECTION PROGRAM

(75) Inventor: Katsuhiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1098 days.

(21) Appl. No.: 12/373,638

(22) PCT Filed: Jul. 31, 2007

(86) PCT No.: PCT/JP2007/064979
§ 371 (c)(1),
(2), (4) Date: Jan. 13, 2009

(87) PCT Pub. No.: WO2008/020544
PCT Pub. Date: Feb. 21, 2008

(65) Prior Publication Data
US 2010/0208071 A1   Aug. 19, 2010

(30) Foreign Application Priority Data
Aug. 18, 2006   (JP) .................................. 2006-223597

(51) Int. Cl.
*H04N 7/18*   (2006.01)
(52) U.S. Cl.
USPC ........................................................ 348/148
(58) Field of Classification Search
USPC ........................................................ 348/148
See application file for complete search history.

(56) References Cited

U.S. PATENT DOCUMENTS

| | | | | |
|---|---|---|---|---|
| 6,625,300 B1* | 9/2003 | Kyo | ............................... | 382/104 |
| 2006/0115121 A1* | 6/2006 | Saka et al. | .................... | 382/104 |
| 2006/0269111 A1* | 11/2006 | Stoecker et al. | ............... | 382/128 |
| 2008/0317282 A1* | 12/2008 | Unoura | .......................... | 382/103 |
| 2009/0051794 A1* | 2/2009 | Ando | ............................. | 348/274 |
| 2013/0141574 A1* | 6/2013 | Dalal et al. | ..................... | 348/148 |

FOREIGN PATENT DOCUMENTS

| | | |
|---|---|---|
| EP | 0479284 | 4/1992 |
| EP | 0910035 | 4/1999 |
| EP | 1617371 | 1/2006 |
| JP | 07192192 | 7/1995 |
| JP | 9-16751 | 1/1997 |
| JP | 9-128548 | 5/1997 |

(Continued)

OTHER PUBLICATIONS

Supplementary EP search report dated Sep. 3, 2010 from EP07791664.

(Continued)

*Primary Examiner* — Waseem Ashraf
(74) *Attorney, Agent, or Firm* — Young & Thompson

(57) ABSTRACT

Attention is paid on the phenomenon that substantially no direct sun light or no reflected light from surrounding objects is applied, to a vehicle bottom side and tire travel surfaces and the vehicle bottom side and the tire travel surfaces have lower luminance values than all the other portions including the shades of trees or buildings along the road in an on-vehicle camera image. Luminance threshold specifying unit (13) analyzes an image luminance histogram and specifies the upper limit of the pixel luminance which can be assumed as a region of the vehicle bottom side. Vehicle assumed region extracting unit (15) assumes that the pixel position having a luminance value not greater than the upper limit is the region of the vehicle bottom side and sets a vehicle assumed region, thereby verifying presence/absence of a vehicle in the vicinity.

9 Claims, 11 Drawing Sheets

(56) References Cited

FOREIGN PATENT DOCUMENTS

| JP | 10-42191 | 2/1998 |
|---|---|---|
| JP | 10-260016 | 9/1998 |
| JP | 11-284997 | 10/1999 |
| JP | 2000-39306 | 2/2000 |
| JP | 2000-113169 | 4/2000 |
| JP | 3069952 | 5/2000 |
| JP | 3072730 | 6/2000 |
| JP | 2004-180200 | 6/2004 |
| JP | 2004-200808 | 7/2004 |
| JP | 2005-031800 | 2/2005 |

OTHER PUBLICATIONS

Otsuka et al., "Vehicle Detection Technology Using Method of Feature Space Projection of Edge Pair", ViEW 2005, Proceedings of Vision Engineering Workshop, The Japan Society for Precision Engineering, pp. 160-165. (cited on page 4 of specification).

Okie, "A White Road Line Recognition System using the Model-Based Method", The Institute of Electronics, Information and Communication Engineers, Technical Report of IEICE, 2001, pp. 53-60.

International Search Report of PCT/JP2007/064979 filed Jul. 31, 2007.

Japanese Official Action—2008-529842—Nov. 20, 2012.

* cited by examiner

| NO: (X COORDINATE, Y COORDINATE) |
|---|
| 1: (300, 300) |
| 2: (301, 300) |
| 3: (302, 300) |
| ⋮ |

VEHICLE DETECTION DEVICE, VEHICLE DETECTION METHOD, AND VEHICLE DETECTION PROGRAM

TECHNICAL FIELD

The present invention relates to a vehicle detection device which detects the presence or absence of a peripheral vehicle based on an image captured by an on-vehicle camera, a vehicle detection method and a vehicle detection program. More particularly, the present invention relates to a vehicle detection device which detects a peripheral vehicle located anterior to or posterior to the vehicle itself, a vehicle detection method and a vehicle detection program.

BACKGROUND ART

Conventionally, some devices capable of detecting a vehicle being in peripheral of the vehicle itself by using an on-vehicle camera and notifying the driver of the presence thereof, have been disclosed. As a typical algorithm of a vehicle detection technology for detecting a peripheral vehicle from an image captured by the on-vehicle camera, a method using pattern matching, with which the features of the vehicle previously set in an image format or a vector format are compared with various partial regions in the image and the presence or absence of the vehicle is determined, is known.

In such a method, however, if checking for the entire region of the image is performed even when there are numerous shapes and sizes of the features of vehicles, large amounts of calculation for checking are needed. Therefore, it has been difficult to detect a vehicle in real time.

In view of this, a vehicle detection technology has been known, and with this method, an assumed region which is assumed to be corresponding to a vehicle in an image is detected by using an algorithm having less calculation amount and pattern matching is applied for only this assumed region.

As algorithms for detecting the assumed region used in the foregoing vehicle detection technology, an algorithm for extracting a pair of vertical edges corresponding to both sides of a vehicle from the image and detecting an assumed region based on that, an algorithm for extracting a black region from the image and detecting an assumed region based on the shape thereof, and an algorithm for extracting a portion where the luminance variation is large in the longitudinal direction from the image and detecting an assumed region based on a variance value of a pixel value within a local region set so as to include the portion, are cited.

As the algorithm for extracting a pair of vertical edges, Patent document 1 discloses a method for detecting a vehicle by verifying how much a pair of vertical edge line segments and horizontal edge line segments existing therebetween satisfies a reference relating to a vehicle respectively. Further, Non-patent document 1 discloses the method for determining whether it is a vehicle or not by voting for positions in a Hough space corresponding to the center position of a pair of vertical edge line segments and inputting the image of the partial region near the position getting a lot of votes into a neutral network discriminator.

As the algorithm for extracting a black region, Patent documents 2 and 3 disclose a method for binarizing a monochrome image, after expanding the black region of the monochrome image so as to divide into a black region and a white region, and determining whether or not the black region corresponds to a vehicle based on the area, the barycenter position, the aspect ratio and the like of the black region after a denoising processing.

As the algorithm for extracting a portion in which luminance variation is large in the longitudinal direction, Patent document 4 discloses the method for detecting a longitudinal axis coordinate that a pixel value indicating luminance changes drastically in a longitudinal direction, and determining that, if a variance value of a pixel value within a partial region set so as to include the longitudinal axis coordinate is larger than a reference value, the partial region corresponds to a vehicle. Patent document 4 described that this method is capable of discriminating a shadow of the vehicle from shadows of trees and the like by being based on the variance value in the partial region.

Non-patent document 1: "Vehicle Detection Technology Using Method of Feature Space Projection of Edge Pair", VIEW 2005, Proceedings of Vision Engineering Workshop, by The Japan Society for Precision Engineering p. 160-165

Patent Document 1: Japanese Patent No. 3072730

Patent Document 2: Japanese Patent Application Laid-open No. H09-016751

Patent Document 3: Japanese Patent Application Laid-open No, H09-128548

Patent Document 4: Japanese Patent No. 3069952

DISCLOSURE OF THE INVENTION

Problems to be Solved by the Invention

However, the methods disclosed in Non-patent document 1 and Patent document 1 assume that there is luminance difference between pixels corresponding to a vehicle to be detected and pixels corresponding to the background region. As shown in FIG. 11, when there is a building 1201 having a low luminance value because it is in the shade, or when there is a black vehicle 1202 in front of roadside trees, or when vehicles 1203 and 1204 having the same body color are captured with an overlap, as luminance difference between pixels of the vehicle and the background becomes slight, there has been an inconvenience that a vertical edge may not be extracted.

Further, in the methods disclosed in Patent documents 2 and 3, the black regions such as shadows of roadside trees or buildings facing the road are extracted. Consequently, there has been inconvenience that the excessive number of partial regions is extracted as assumed regions if these shadows exist on the road surface.

The invention recited in Patent document 4 is capable of distinguishing shadows of vehicles from shadows of roadside trees or buildings facing the road and capable of limiting an assumed region more effectively, compared to the other methods described above. However, it is very difficult to set a reference value for determining whether or not it is an assumed region because a luminance distribution of pixels included in a partial region changes variously depending on circumstances. Further, the assumed region is extracted by determining whether or not it is the shadow of a vehicle by a valiance value, so there has been such an inconvenience that a partial region including road paints such as a crosswalk having strong contrast with the road is extracted as an assumed region by error.

It is therefore an object of the present invention to solve the problem described above and to provide a vehicle detection device which is capable of detecting exactly an assumed region which can be assumed to be representing a vehicle in an image captured by an on-vehicle camera and determining whether or not the assumed region is the image of a vehicle, and a vehicle detection method and a vehicle detection program.

Means for Solving the Problems

In order to achieve such an object, a vehicle detection device according to the present invention is a device for detecting the presence or absence of a peripheral vehicle based on an image captured by an on-vehicle camera and includes: a luminance creating unit for creating a brightness distribution of the captured image; a luminance threshold specifying unit for estimating and outputting an upper limit for a luminance value corresponding to the region of the vehicle bottom side of a peripheral vehicle by analyzing the brightness distribution of the image created by the luminance creating unit; and a vehicle detecting unit for deciding a vehicle assumed region including the vehicle bottom side having the luminance value not greater than the upper limit and for determining whether or not the image of the vehicle assumed region corresponds to a vehicle by a pattern matching method.

The present invention is established as a vehicle detection device as hardware, however, it is not limited to that. The present invention may be established as a vehicle detection program as software or a vehicle detection method.

A vehicle detection method according to the present invention is a method for detecting the presence or absence of a peripheral vehicle based on an image captured by an on-vehicle camera, and includes: creating a brightness distribution of the captured image; estimating and outputting an upper limit for a luminance value corresponding to the region of the vehicle bottom side of a peripheral vehicle by analyzing the brightness distribution of the image; and deciding a vehicle assumed region including the vehicle bottom side having the luminance value not greater than the upper limit and determining whether or not the image of the vehicle assumed region corresponds to a vehicle by a pattern matching method.

A vehicle detection program according to the present invention causes a computer configuring a vehicle detection device for detecting the presence or absence of a peripheral vehicle based on an image captured by an on-vehicle camera to execute: a function of creating a brightness distribution of the captured image; a function of estimating and outputting an upper limit for a luminance value corresponding to the region of the vehicle bottom side of a peripheral vehicle by analyzing the brightness distribution of the image created by the luminance creating unit; and a function of deciding a vehicle assumed region including the vehicle bottom side having the luminance value not greater than the upper limit and determining whether or not the image of the vehicle assumed region corresponds to a vehicle by a pattern matching method.

Effects of the Invention

According to the present invention, effective detection of a peripheral vehicle can be achieved by focusing on the fact that illuminance of a road surface and a tire running surface at the bottom side of a vehicle is lower than all other regions including shadows of roadside trees or buildings around the road in an image captured by an on-vehicle camera.

DESCRIPTION OF EXEMPLARY EMBODIMENTS

Hereinafter, exemplary embodiments of the invention will be explained with reference to the drawings.

Exemplary Embodiment 1

FIG. 1 is a block diagram showing a configuration of a vehicle detection device according to a first exemplary embodiment of the invention.

As shown in FIG. 1, the vehicle detection device according to the first exemplary embodiment of the invention includes: a luminance creating unit (12) for creating a brightness distribution of the image captured by an on-vehicle camera; a luminance threshold specifying unit 13 for estimating and outputting an upper limit for a luminance value corresponding to the region of the vehicle bottom side of a peripheral vehicle by analyzing the brightness distribution of the image created by the luminance creating unit (12); and a vehicle detecting unit 16 for deciding a vehicle assumed region including the vehicle bottom side having the luminance value not greater than the upper limit and for determining whether or not the image of the vehicle assumed region corresponds to a vehicle by a pattern matching method.

In the exemplary embodiment shown in FIG. 1, a luminance histogram creating unit 12 for creating a luminance histogram of the captured image as the brightness distribution of the image is used as the luminance creating unit. In FIG. 1, 1 means an image inputting unit 11 for inputting an image captured by an on-vehicle camera.

The vehicle detecting unit 16 includes a low luminance pixel extracting unit 14 and a vehicle assumed region extracting unit 15. The low luminance pixel extracting unit 14 extracts low luminance pixels having the luminance value not greater than the upper limit output by the luminance threshold specifying unit 13 from the captured image. The vehicle assumed region extracting unit 15 decides the vehicle assumed region in which the low luminance pixels are included in the vehicle bottom side based on the preset positional relationship between the vehicle bottom side and the vehicle region.

The luminance histogram creating unit 12 shown in FIG. 1 creates a luminance histogram indicating a luminance distribution of an input image. The input image includes a gray-scale image showing luminance or a color image. In the case of a color image, the luminance histogram creating unit 12 may create the luminance histogram by calculating the luminance value from the color information, or may create the luminance histogram by using a green component value which is contributing the most to the luminance value in place of the luminance value in order to omit the calculation of the luminance component and to speed up.

The luminance threshold specifying unit 13 presets the number of pixels of the shadow area of the road surface at the bottom side of the vehicle in the case of assuming that the vehicle to be detected is captured in the largest size in the image. And, the luminance threshold specifying unit 13 calculates percentage of the preset number of pixels for the total number of pixels of the input image, and then calculates the threshold so that the calculated percentage becomes equal to the percentage of cumulative pixels, which is accumulated from the lowest luminance up to the threshold in the luminance histogram, for the total number of pixels.

The estimation process of the threshold of the luminance by the luminance threshold specifying unit 13 will be explained with reference to FIG. 2. FIG. 2 is a diagram showing an image captured by an on-vehicle camera.

In FIG. 2, a tire running surface 203 of a vehicle 201 and a road surface 202 with which the tire running surface 203 is in contact are located at the bottom side of the vehicle 201. A space 204 between the vehicle 201 and the road surface 202 is normally as short as a few dozens of centimeter. A direct light 205 of sun is blocked off by the vehicle 201, and so amount of incident of the direct light 205 to the sides of the tire running surface 203 and the road surface 202 is extremely limited. Further, an indirect light 206 reflected from nearby objects is also blocked off by the vehicle 201, and amount of incident of the indirect light 206 to the sides of the tire running surface 203 and the road surface 202 is very small. Therefore, regardless of the weather such as sunny, cloudy or rainy weather, the brightness of the road surface 202 and the tire running surface 203 located at the bottom side of the vehicle 201 becomes dark compared to the brightness of the region to which the direct light 205 and the indirect light 206 are directly incident. If the image region corresponding to the road surface and the tire running surface at the bottom side of the vehicle in the input image shall be the vehicle bottom region, a luminance value of pixels corresponding to the vehicle bottom region is limited below a certain value when camera parameters are fixed. This value shall be a first upper limit for a luminance value.

In the case of being captured by an on-vehicle camera, the captured image includes the road surface 202 and the tire running surface 203 at the bottom side of the vehicle, which has small amount of incident, the region outside of the vehicle 201 to which the direct light 205 and the indirect light 206 are directly incident, a shadow of roadside tree 207 on the road and a shadow 208 being the side of the vehicle itself. In this case, the illuminance within the image range captured by the on-vehicle camera becomes the lowest at the tire running surface 203 and the road surface 202, at the bottom side of the vehicle, which has the smallest amount of incident of the direct light 205 and the indirect light 206 because of being blocked off by the vehicle 201.

The luminance threshold specifying unit 13 therefore calculates in advance percentage of the area of the regions of the vehicle bottom sides (202 and 203) in the captured image size on condition that the area takes the maximum value. And then, the luminance threshold specifying unit 13 regards a luminance value at which the percentage of an accumulated luminance histogram, which is accumulated from the lower side of the luminance in the captured image, is equal to the percentage of the area on condition that the area of the vehicle bottom region takes the maximum value as a second upper limit for a luminance value, and calculates the smaller one of the first and the second upper limits for the luminance value as a threshold. In the case where a plurality of vehicles could be included in the captured image, the second upper limit for the luminance value may be obtained based on the percentage of the area summing up the vehicle bottom region of each vehicle in the size of the captured image.

The low luminance pixel extracting unit 14 shown in FIG. 1 extracts low luminance pixels indicating a luminance value below a threshold specified by the luminance threshold specifying unit 13 from each pixel in the input image, and stores the location information. As a storing format of the locations of the low luminance pixels, a binary image in which a low luminance pixel 301 is represented as 1 and the other pixels are represented as 0 may be formed as shown in FIG. 3A. Further, as shown in FIG. 3B, a list format indicated by x, y coordinates may be used for storing.

The vehicle assumed region extracting unit 15 extracts one or more vehicle assumed regions based on the locations of the extracted low luminance pixels. The extraction process of the vehicle assumed region by the vehicle assumed region extracting unit 15 will be explained with reference to FIG. 4.

As shown in FIG. 4, when a low luminance pixel 401 is extracted by the low luminance pixel extracting unit 14, the vehicle assumed region extracting unit 15 sets a vehicle assumed region 402 which is assumed to be an image of a peripheral vehicle. More specifically, the vehicle assumed region extracting unit 15 divides the rectangular vehicle assumed region 402 into quarters so as to be arranged in the longitudinal direction (shown with a dotted line) and sets the vehicle assumed region 402, in which the low luminance pixel 401 is located, within a range region 403 that is the lowest part of the divided vehicle assumed region 402.

Here, the height of the range region 403 shown in FIG. 4 shall be a quarter of the height of the vehicle assumed region 402. However, it is not limited to that. A percentage that the vehicle bottom region accounts for in the heightwise direction in the image of the vehicle may be calculated preliminary, and the height of the range region 403 may set to be a height corresponding to the percentage.

Further, in the first exemplary embodiment, the vehicle assumed region 402 is set so as to include the low luminance pixel 401 more than a certain number in the range region 403. However, it is not limited to that. Instead of the configuration in FIG. 4, the vehicle assumed region 402 may be set so as to include the low luminance pixel in regions 501 which are the both end sides of the range region 403 divided into quarters so as to be arranged in the widthwise direction, as shown in FIG. 5. Thereby, the setting condition of the vehicle assumed region 402 becomes strict, so the number of pixels of the vehicle assumed region 402 to be set can be limited. Moreover, as a standard relating to the included low luminance pixels, it may be a certain number regardless of the location in the image. For the bottom part of the input image in which the area of the vehicle bottom region tends to become large, the vehicle assumed region may be set in the region which includes more low luminance pixels compared to the region near the center of the input image.

The vehicle assumed region 402 is set with various sizes and at various locations to satisfy the condition. In this regard, however, in the case where it is known that the road and the vehicle are captured in the image as shown in FIG. 2, as the captured size of the vehicle relates to the longitudinal location in the image, the size of the vehicle assumed region 402 is to be set corresponding to the location in the image based on the relation. In other words, the more low luminance pixel 401 exists near the bottom of the input image, the larger the vehicle assumed region 402 is to be set, and, the more low luminance pixel 401 exists near the center of the input image, the smaller the vehicle assumed region 402 is to be set.

The vehicle detecting unit 16 shown in FIG. 1 compares the image of each extracted vehicle assumed region 402 and an actual vehicle image (template), performs pattern matching and determines whether or not the image of the vehicle assumed, region 402 corresponds to a vehicle. As a learning/discrimination apparatus used for pattern matching, a neutral network as recited in Non-patent document 1 may be used, or a support vector machine, a learning vector quantization method, a subspace method and the like may be used. Further, as a feature amount used for a learning/discrimination, a pixel value of a luminance image or a Gabor wavelet feature may be used.

Next, a case of detecting a vehicle by using the vehicle detection device according to the first exemplary embodiment will be explained.

First, the image inputting unit 11 inputs an image captured by an on-vehicle camera (FIG. 6: step s61) and then outputs the input image to the luminance histogram creating unit 12. When the luminance histogram creating unit 12 obtains the input image, it creates a luminance histogram of the input image (FIG. 6: step s62, luminance histogram creating step). The luminance threshold specifying unit 13 specifies a threshold of luminance for extracting pixels corresponding to the vehicle bottom region based on the luminance histogram created by the luminance histogram creating unit 12 (FIG. 6: step s63, luminance threshold specifying step).

As to the luminance histogram creating step and the luminance threshold specifying step described above, the contents may be programmed and may be executed by a computer as a luminance histogram creating processing and a luminance threshold specifying processing.

Subsequently, the low luminance pixel extracting unit 14 measures luminance of each pixel in the input image, extracts low luminance pixels indicating luminance below a threshold and stores the location information thereof (FIG. 6: step s64, low luminance pixel extracting step). The vehicle assumed region extracting unit 15 sets and extracts a vehicle assumed region in the input image based on the locations of the low luminance pixels extracted by the low luminance pixel extracting unit 14 (FIG. 6: step s65, vehicle assumed region extracting step). The vehicle assumed region extracting unit 15 sets the vehicle assumed region at the locations of the low luminance pixels corresponding to the tire running surface 203 and the road surface 202 at the bottom side of the vehicle respectively. The vehicle detecting unit 16 performs pattern matching for the image of each vehicle assumed region set by the vehicle assumed region extracting unit 15 and determines whether or not the image of each vehicle assumed region is an image of a peripheral vehicle (FIG. 6: step s66, vehicle detecting step).

In the case where a vehicle is detected in a plurality of vehicle assumed regions having overlap, the vehicle detecting unit 16 integrates extraction results so as to employ only a detection result corresponding to a maximum value in similarity (FIG. 6: step s67), performs pattern matching for the images of all vehicle assumed regions and ends the processing.

As to the low luminance pixel extracting step, the vehicle assumed region extracting step and the vehicle detecting step described above, the contents may be programmed and may be executed by a computer as a low luminance pixel extracting processing, a vehicle assumed region extracting processing and a vehicle detecting processing.

According to the first exemplary embodiment as described above, because of specifying an upper limit for luminance value of pixels assumed to correspond to the image of shadow area at the bottom side of the peripheral vehicle by analyzing a luminance histogram of the input image, it is possible to set a threshold being an upper limit adaptively and to extract a low luminance region which is assumed to be the shadow area at the bottom side of the peripheral vehicle favorably.

Exemplary Embodiment 2

Next, a vehicle detection device according to a second exemplary embodiment of the invention will be explained.

FIG. 7 is a block diagram showing a configuration of the vehicle detection device according to the second exemplary embodiment of the invention.

As shown in FIG. 7, the second exemplary embodiment includes a road surface region extracting unit 77 in addition to the configuration of the first exemplary embodiment shown in FIG. 1.

The road surface region extracting unit 77 extracts a road surface region which is an image region indicating a road surface from an image captured by an on-vehicle camera. As the method for extracting of the road surface region by the road surface region extracting unit 77, the method for extracting a region sandwiched between right and left white lines as a road region after detecting the white lines by using a white line detection method may be used, as recited in a document ("A White Road Line Recognition System using the Model-Based recognition method", by The Institute of Electronics, Information and Communication Engineers, Technical Report PRMU99-211). Also, as disclosed in Patent document (Japanese Patent Application Laid-open No. 2001-101420), the method for detecting a road surface directly may be used without detecting a white line.

A luminance histogram creating unit 72 shown in FIG. 7 creates a luminance histogram indicating a luminance distribution of the road surface region extracted by the road surface region extracting unit 77. A luminance threshold specifying unit 73 specifies an upper limit (threshold) for luminance value of pixels which is assumed to be a vehicle bottom region, based on the luminance histogram. In other words, comparing to the first exemplary embodiment shown in FIG. 1, the second exemplary embodiment is different in that the luminance histogram to be analyzed is a brightness distribution of only a road surface region.

In this way, by limiting a summary range of the luminance histogram to be created to only a road surface region, it becomes possible to speed up the processing to specify a threshold. Further, even if there is a region having a luminance value comparable to the luminance of the vehicle bottom region due to a particular structure of buildings facing a road, when the region is outside of the road surface region, it is possible to specify an upper limit (threshold) for a luminance value of pixels assumed to be the vehicle bottom region without being affected by the region outside.

A low luminance pixel extracting unit 74 shown in FIG. 7 extracts low luminance pixels indicating luminance below the threshold specified by the luminance threshold specifying unit 73 from each pixel within the road surface region and stores the location.

A vehicle assumed region extracting unit 75 sets and extracts a vehicle assumed region based on the locations of the low luminance pixels, as well as the first exemplary embodiment shown in FIG. 1. A vehicle detecting unit 76 determines whether or not the image of the vehicle assumed region is an image of a peripheral vehicle by performing pattern matching, as well as the first exemplary embodiment shown in FIG. 1.

Next, the case of detecting a vehicle by using the vehicle detection device according to the second exemplary embodiment of the invention will be explained.

FIG. 8 is a flowchart showing a processing operation of the vehicle detection device of the second exemplary embodiment.

First, an image inputting unit 71 inputs an image captured by an on-vehicle camera (FIG. 8: step s81). The road surface region extracting unit 77 extracts a road surface region from the input image (FIG. 8: step s82, road surface region extracting step).

The luminance histogram creating unit 72 creates a luminance histogram of the road surface region extracted by the road surface region extracting unit 77 (FIG. 8: step s83, luminance histogram creating step). The luminance threshold specifying unit 73 specifies a threshold of luminance for extracting pixels corresponding to the vehicle bottom region based on the luminance histogram created by the luminance histogram creating unit 72 (FIG. 8: step s84, luminance threshold specifying step).

As to the road surface region extracting step, the luminance histogram creating step and the luminance threshold specifying step described above, the contents may be programmed and may be executed by a computer as a road surface region extracting processing, a luminance histogram creating processing and a luminance threshold specifying processing.

The low luminance pixel extracting unit 74 measures luminance of each pixel within the road surface region extracted by the road surface region extracting unit 77, extracts low luminance pixels indicating luminance below a threshold and stores the location (FIG. 8: step s85, low luminance pixel extracting step).

The vehicle assumed region extracting unit 75 sets a vehicle assumed region at various locations and extracts it based on the locations of the low luminance pixels extracted by the low luminance pixel extracting unit 74 (FIG. 8: step s86, vehicle assumed region extracting step). The vehicle detecting unit 76 determines whether or not the image of each vehicle assumed region is an image of a peripheral vehicle by performing pattern matching for the image of each vehicle assumed region extracted by the vehicle assumed region extracting unit 75 (FIG. 8: step s87, vehicle detecting step). The vehicle detecting unit 76 integrates extraction results so as to employ only a detection result corresponding to maximum value in similarity, in the case where a vehicle is detected in a plurality of vehicle assumed regions having overlap (FIG. 8: step s88), performs pattern matching for the images of all vehicle assumed regions and ends the processing.

As to the low luminance pixel extracting step, the vehicle assumed region extracting step and the vehicle detecting step described above, the contents may be programmed and may be executed by a computer as a low luminance pixel extracting processing, a vehicle assumed region extracting processing and a vehicle detecting processing.

According to the second exemplary embodiment as described above, the vehicle detecting processing is performed for only the image region of the road surface in the captured image. Therefore, a processing time is reduced comparing to the detecting processing for the entire captured image. Further, as an object similar to a vehicle, other than a vehicle, is less likely to be captured in the road surface region, an error detection ratio is reduced.

Exemplary Embodiment 3

Next, a vehicle detection device according to a third exemplary embodiment of the invention will be explained with reference to FIG. 9.

In the exemplary embodiments described above, the vehicle assumed region extracting unit decides the vehicle assumed region based on the information from the low luminance pixel extracting unit. However, it is not limited to that. The vehicle assumed region extracting unit may extract a partial region, which has a possibility of corresponding to a peripheral vehicle, from the captured image as the vehicle assumed region and may perform the verification in another step. This example will be explained as the third exemplary embodiment.

As shown in FIG. 9, the third exemplary embodiment includes: an image inputting unit 91 for inputting an image captured by an on-vehicle camera; a luminance histogram creating unit 93 for creating a luminance histogram of the input image; a luminance threshold specifying unit 94 for specifying an upper limit (threshold) for luminance value of pixels assumed to be a vehicle bottom region by analyzing the luminance histogram; and a vehicle detecting unit 95 for deciding the vehicle assumed regions (202 and 203) including the vehicle bottom region having the luminance value not greater than the upper limit and for determining whether or not the image of the vehicle assumed region corresponds to a vehicle by using a pattern matching method.

The vehicle detecting unit 95 includes a low luminance pixel extracting unit 96, a vehicle assumed region extracting unit 92 and a verifying unit 97. Note that the low luminance pixel extracting unit 96 has the same configuration as the low luminance pixel extracting unit 14 shown in FIG. 1.

The vehicle assumed region extracting unit 92 extracts a partial region, which has a possibility of corresponding to a peripheral vehicle, from the image captured by an on-vehicle camera as the vehicle assumed region. More specifically, the vehicle assumed region extracting unit 92 may extract the partial region determined as a vehicle image by performing pattern matching for the entire input image, or may calculate distance information from a stereo image which is obtained by using an on-vehicle stereo camera as a capturing unit and then may extract a region that the shape of the distance information is similar to a vehicle. Further, the vehicle assumed region extracting unit 92 may make location information obtained by using a millimeter wave sensor or a laser radar sensor correspond to the location in the captured image, may detect the location where an obstacle exists by the millimeter wave sensor or the laser radar sensor, and then may extract a partial region corresponding to the location in the input image.

The luminance threshold specifying unit 94 shown in FIG. 9 analyzes a luminance histogram of the input image and calculates an upper limit (threshold) for luminance value of pixels assumed to be a vehicle bottom region, as well as the first exemplary embodiment shown in FIG. 1.

The verifying unit 97 measures whether or not low luminance pixels indicating a luminance value below a threshold is included more than predetermined pixels at the bottom of the vehicle assumed region extracted by the vehicle assumed region extracting unit 92, and if included, determines the vehicle assumed region is an image of a peripheral vehicle. Thereby, whether or not the vehicle assumed region is an image of a peripheral vehicle is determined finally.

Next, the case of detecting a vehicle by using the vehicle detection device according to the third exemplary embodiment of the invention will be explained.

FIG. 10 is a flowchart showing a processing operation of the vehicle detection device of the third exemplary embodiment.

First, the image inputting unit 91 input an image captured by an on-vehicle camera (FIG. 10: step s101). The vehicle assumed region extracting unit 92 extracts a partial region which has a possibility of a peripheral vehicle image as a vehicle assumed region (FIG. 10: step s102, vehicle assumed region extracting step).

The luminance histogram creating unit 93 creates a luminance histogram of the input image as well as the first exemplary embodiment shown in FIG. 1 (FIG. 10: step s103, luminance histogram creating step). The luminance threshold specifying unit 94 analyzes the luminance histogram created by the luminance histogram creating unit 93 and specifies an upper limit (threshold) for luminance value of pixels corresponding to a vehicle bottom region (FIG. 10: step s104, luminance threshold specifying step).

The verifying unit 97 measures whether or not low luminance pixels indicating luminance below a threshold are included more than predetermined pixels at the bottom of the vehicle assumed region extracted by the vehicle assumed region extracting unit 92 based on the output data from the vehicle assumed region extracting unit 92 and the low luminance pixel extracting unit 96, and outputs the final determination result whether or riot the image of the vehicle assumed region is an image of a peripheral vehicle.

The vehicle detecting unit 95 determines whether or not the image of the vehicle assumed region verified by the verifying unit 97 corresponds to a vehicle by using a pattern matching method, based on the data output from the verifying unit 97 (FIG. 10: step s105, vehicle detecting step) and measures the presence or absence of low luminance pixels for all vehicle assumed regions and then ends the processing.

As to the vehicle assumed region extracting step, the luminance histogram creating step, the luminance threshold specifying step and the vehicle detecting step described above, the contents may be programmed and executed by a computer as a vehicle assumed region extracting processing, a luminance histogram creating processing, a luminance threshold specifying processing and a vehicle detecting processing.

According to the third exemplary embodiment described above, even if the vehicle assumed region extracting unit 92 extracts an image region having a shape similar to a vehicle, for example, images of a container-like object on the road, a square window frame or the like, as a vehicle assumed region by error, the bottoms of these objects does not have structure to which a direct right of sun and an indirect light from peripheral objects are not incident, and low luminance pixels are not included in the detected image. Therefore, by measuring that the low luminance pixels are not included in the detected image, it is possible to determine that the vehicle assumed region is detected by error.

As above, the present invention has been explained with reference to the exemplary embodiments (and examples) However, the present invention is not limited to the exemplary embodiments (and examples) described above. The configurations and details of the present invention can be made various modifications that one skilled in the art is able to understand within the scope of the present invention.

This application claims priority from Japanese Patent Application No. 2006-223597 filed Aug. 18, 2006, which is incorporated herein in its entirety.

Figure 1:
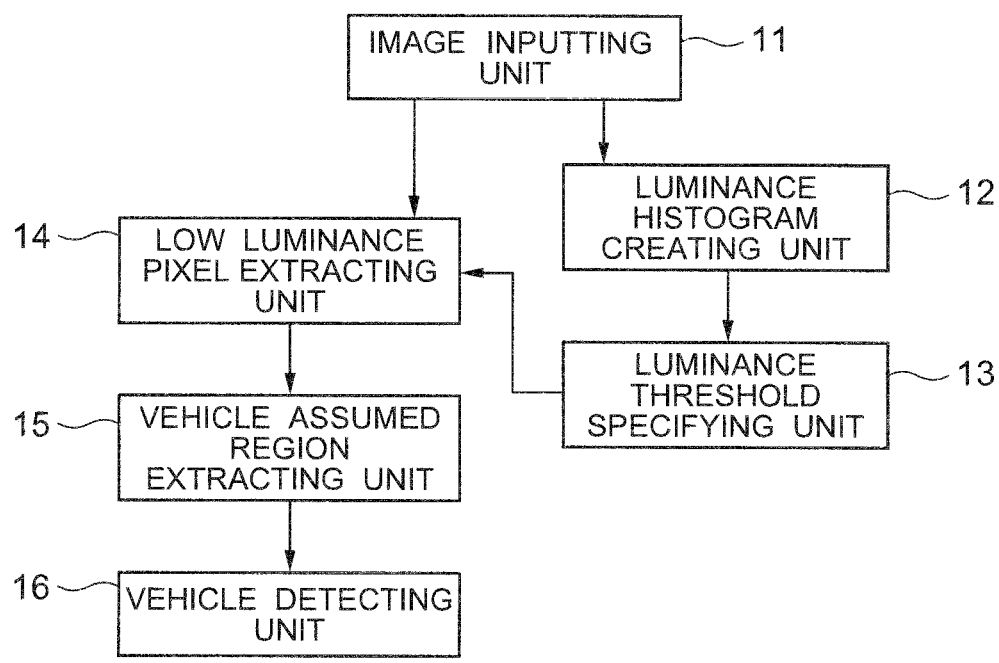
FIG. 1 is a block diagram showing the configuration of a vehicle detection device according to a first exemplary embodiment of the invention.
Figure 2:
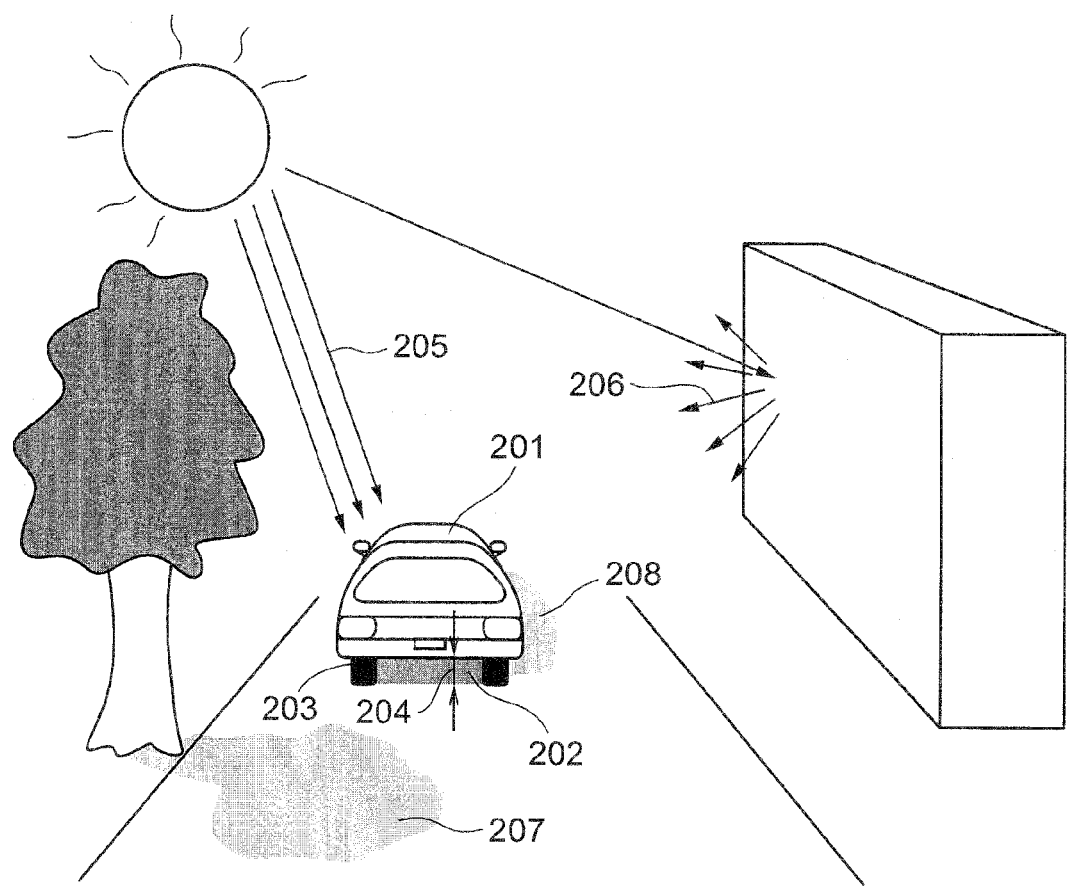
FIG. 2 is a diagram showing an example of an image captured by an on-vehicle camera of the exemplary embodiment shown in FIG. 1.
Figures 3A, 3B:
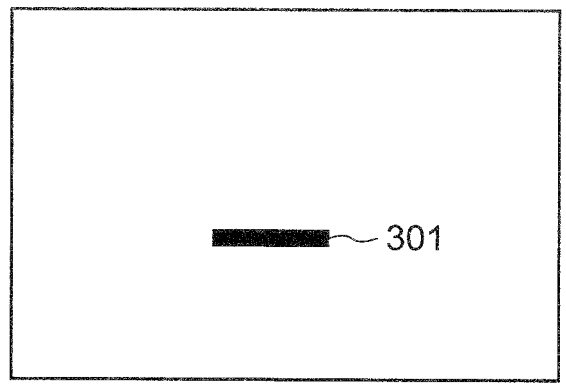
FIG. 3 is a diagram showing a storing format of the location of a low luminance pixel extracted in the exemplary embodiment shown in FIG. 1.
Figure 4A:
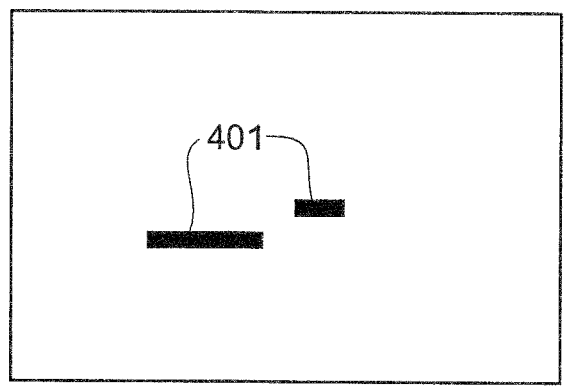
FIG. 4 is a diagram showing an example of a vehicle assumed region set in the exemplary embodiment shown in FIG. 1.
Figure 4B:
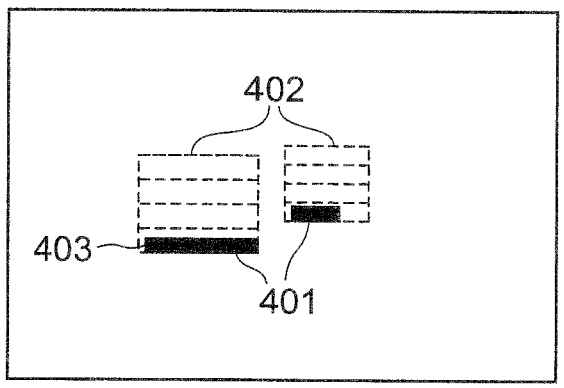
Figure 5:
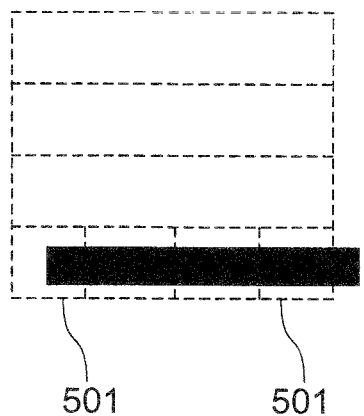
FIG. 5 is a diagram showing another example of the vehicle assumed region set in the exemplary embodiment shown in FIG. 1.
Figure 6:
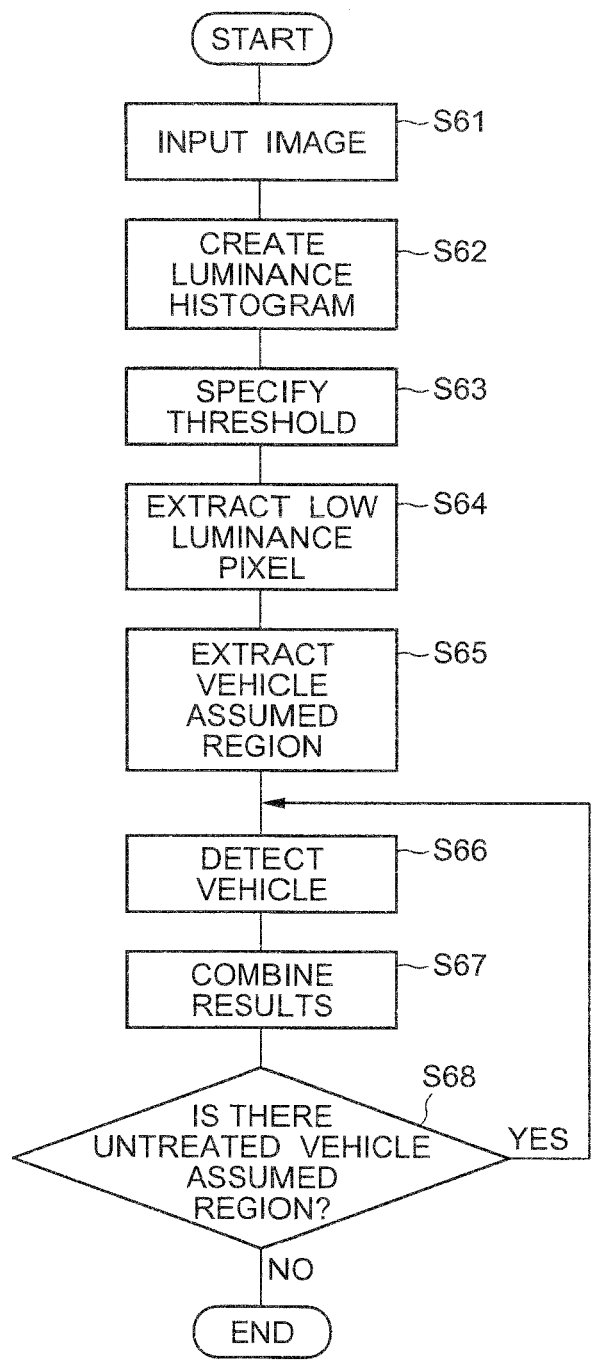
FIG. 6 is a flowchart showing an operation of the vehicle detection device of the exemplary embodiment shown in FIG. 1.
Figure 7:
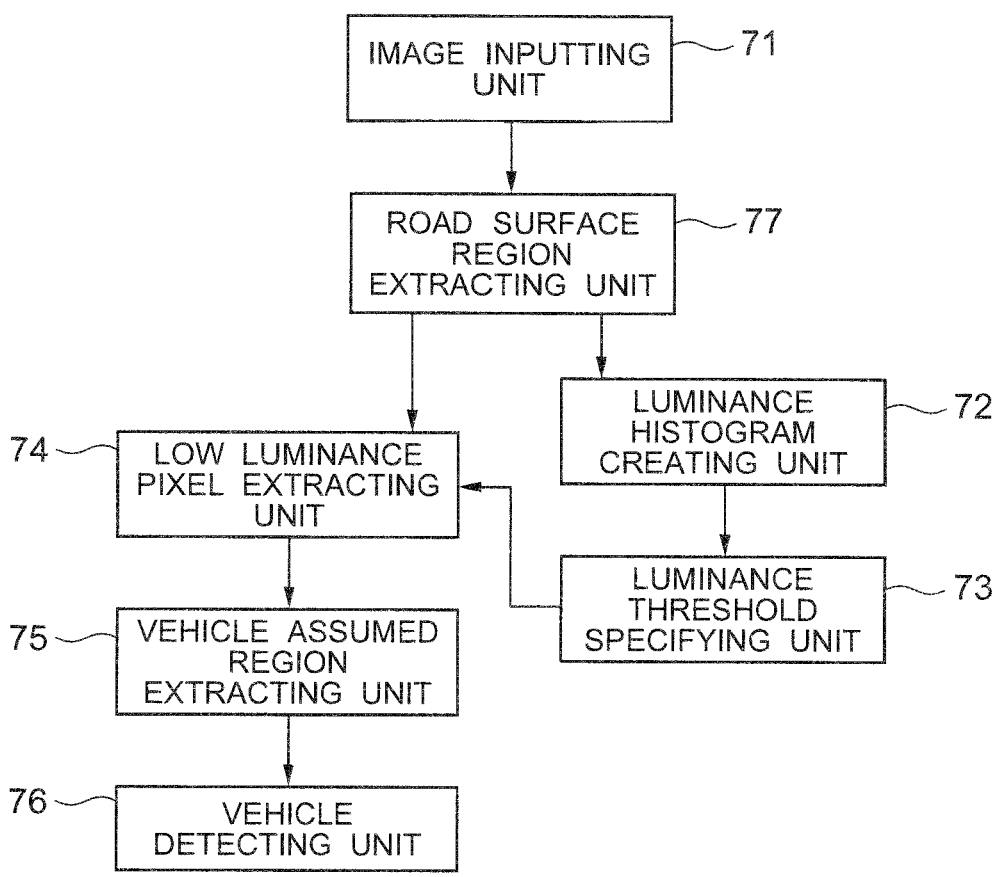
FIG. 7 is a block diagram showing the configuration of a vehicle detection device according to a second exemplary embodiment of the invention.
Figure 8:
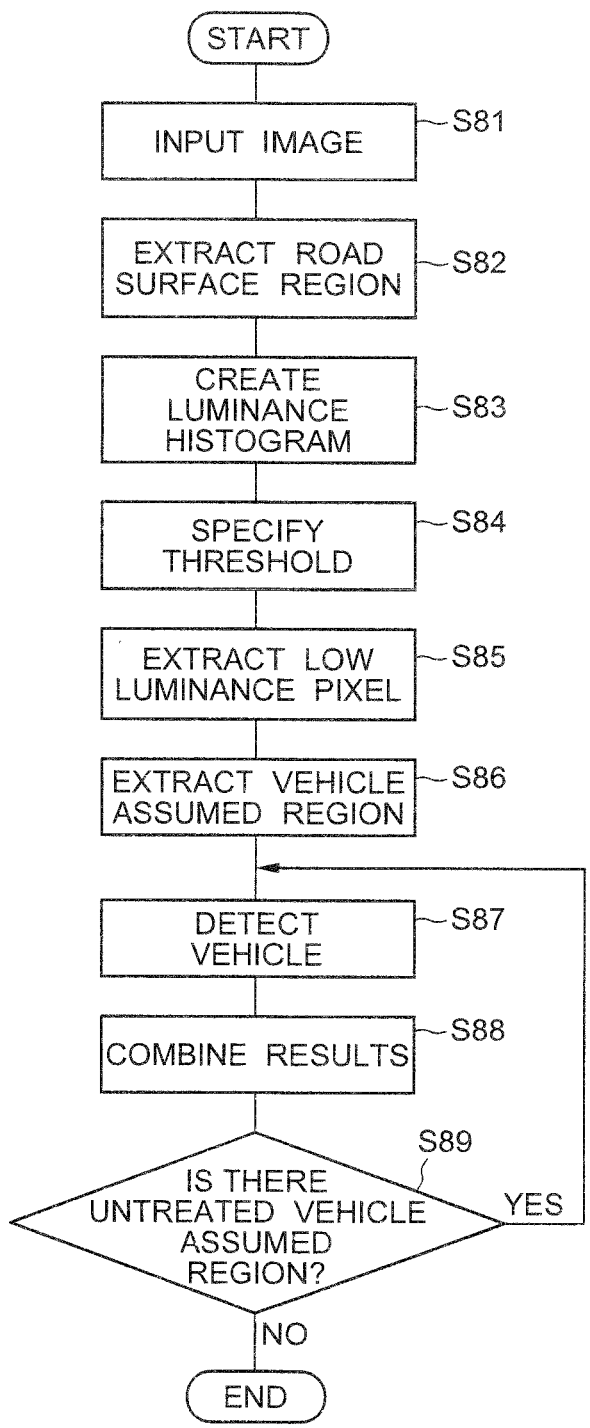
FIG. 8 is a flowchart showing an operation of the vehicle detection device of the exemplary embodiment shown in FIG. 7.
Figure 9:
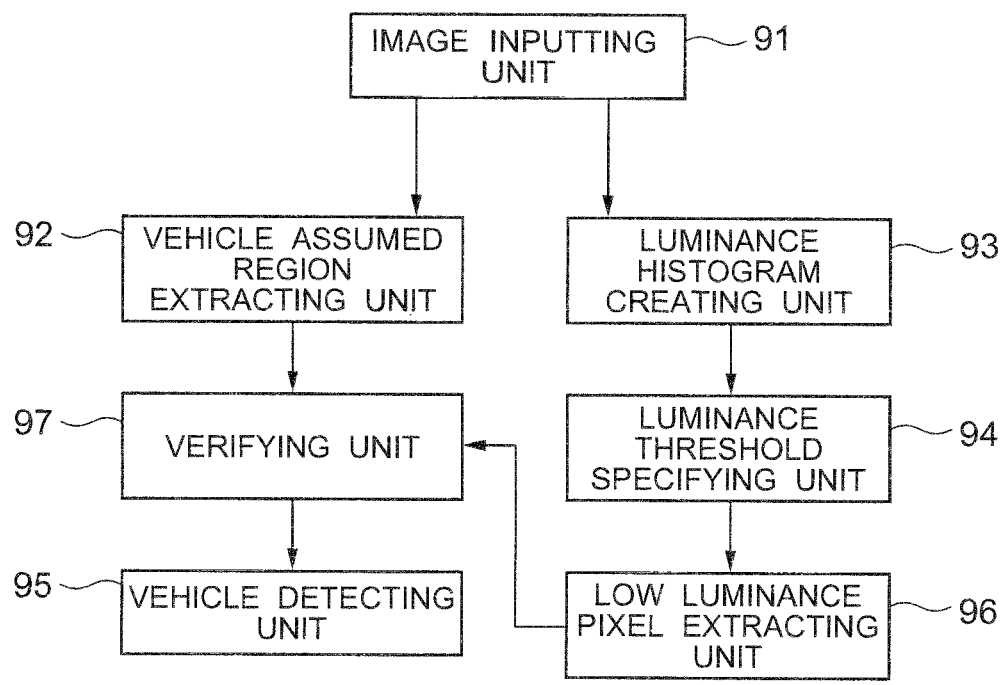
FIG. 9 is a block diagram showing the configuration of a vehicle detection device according to a third exemplary embodiment of the invention.
Figure 10:
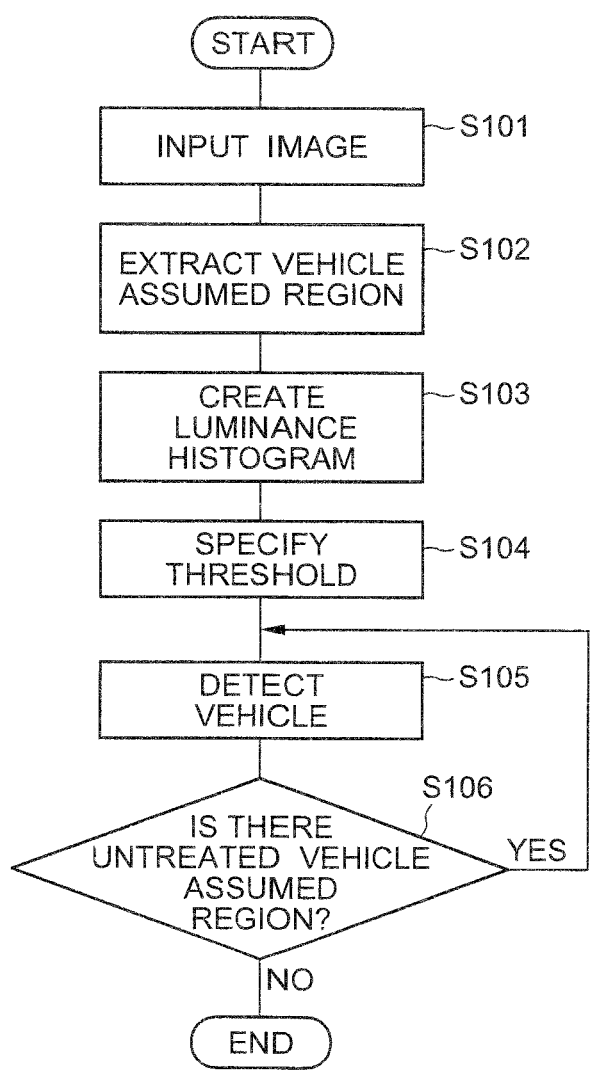
FIG. 10 is a flowchart showing an operation of the vehicle detection device of the exemplary embodiment shown in FIG. 9.
Figure 11:
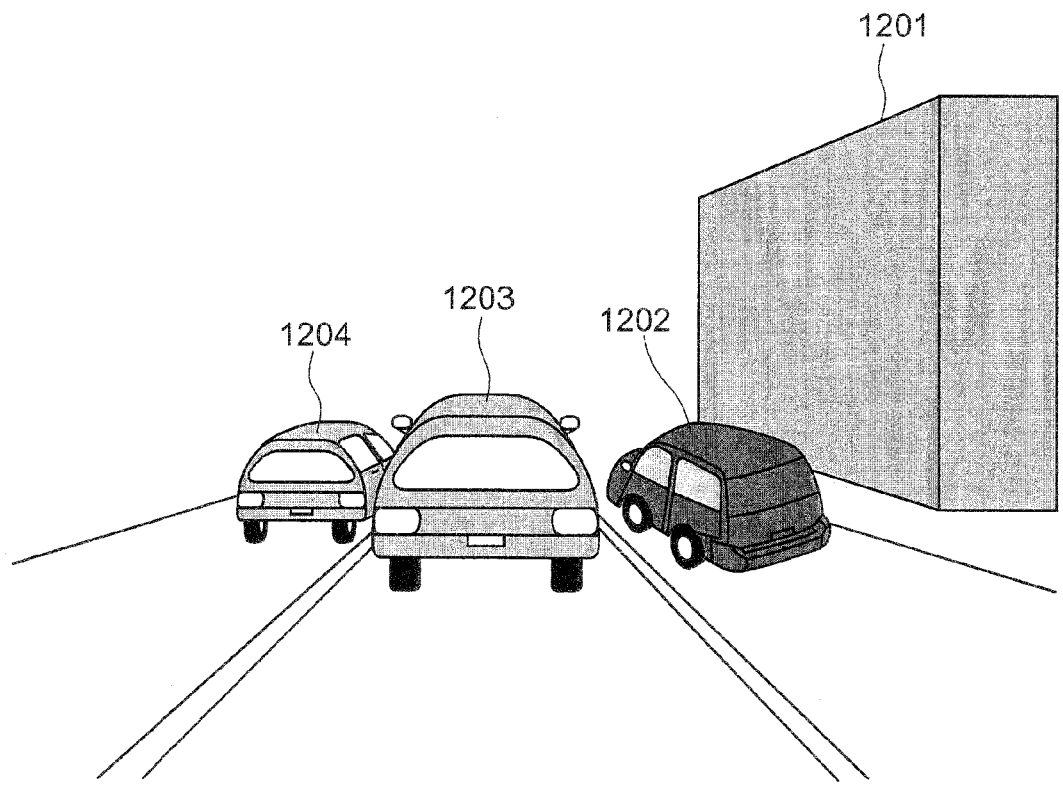
FIG. 11 is a diagram showing an example of an image captured by a common on-vehicle camera.

DESCRIPTION OF SYMBOLS 11, 71, 91 image inputting unit
12, 72, 93 luminance histogram creating unit
13, 73, 94 luminance threshold specifying unit
14, 74 low luminance pixel extracting unit
15, 75 vehicle assumed region extracting unit
16, 76 vehicle detecting unit
77 road surface region extracting unit
92 vehicle assumed region extracting unit
95 vehicle detecting unit

What is claimed is:

1. A vehicle detection device for detecting the presence or absence of a peripheral vehicle based on an image captured by an on-vehicle camera, comprising:
computer hardware configured to include: a luminance creating unit operatively connected to an output of the on-vehicle camera and receiving the captured image, the luminance creating unit configured to create a luminance histogram of the captured image;
a luminance threshold specifying unit operatively connected to an output of the luminance creating unit, the luminance threshold unit configured to i) analyze the luminance histogram of the captured image and ii) output a luminance value that a cumulative histogram value accumulated from a lower side of luminance of the luminance histogram that accounts for a predetermined percentage in a total number of pixels used for creating the luminance histogram as an upper limit for the luminance value; and
a vehicle detecting unit operatively connected to an output of the luminance threshold specifying unit, the vehicle detecting unit i) deciding a vehicle assumed region which is a region assumed to include a vehicle bottom side having the luminance value not greater than the upper limit and ii) to determine whether or not the image of the vehicle assumed region corresponds to a vehicle by using a pattern matching method,
wherein the luminance threshold specifying unit is configured i) to calculate the percentage based on a ratio of the number of pixels assumed to include the vehicle bottom region on a condition that the peripheral vehicle to be detected is captured in the largest size in the image and to the total number of pixels used for creating the luminance histogram, and ii) to adaptively determine the threshold in the luminance histogram, for the total number of pixels, and
wherein the vehicle detecting unit determines the vehicle assumed region corresponds to the presence of the peripheral vehicle based on the vehicle assumed region pattern successfully matching a shadow area at the bottom side of the peripheral vehicle;

a road surface region extracting unit, wherein, the road surface region extracting unit is configured to extract a road surface region from the captured image; and the luminance threshold specifying unit is configured to estimate and output an upper limit for a luminance value corresponding to the region of a vehicle bottom of a peripheral vehicle by analyzing the luminance histogram of the image created by the luminance creating unit within the road surface region extracted by the road surface region extracting unit.

2. The vehicle detection device as claimed in claim 1, wherein, the vehicle detecting unit includes a low luminance pixel extracting unit and a vehicle assumed region extracting unit;

the low luminance pixel extracting unit is configured to extract a low luminance pixel having the luminance value not greater than the upper limit output by the luminance threshold specifying unit from the captured image; and the vehicle assumed region extracting unit is configured to decide the vehicle assumed region in which the low luminance pixel is included in the vehicle bottom based on the preset positional relationship between the vehicle bottom side and the vehicle region.

3. The vehicle detection device as claimed in claim 1, wherein, the vehicle detecting unit includes a low luminance pixel extracting unit, a vehicle assumed region extracting unit and a verifying unit;

the low luminance pixel extracting unit is configured to extract a low luminance pixel having the luminance value not greater than the upper limit output by the luminance threshold extracting unit from the captured image;

the vehicle assumed region extracting unit is configured to extract a partial region having a possibility of corresponding to a peripheral vehicle as the vehicle assumed region from the captured image; and the verifying unit is configured to verify whether or not the low luminance pixel is included in the vehicle assumed region extracted by the vehicle assumed region extracting unit based on the luminance value not greater than the upper limit output by the low luminance pixel extracting unit.

4. A vehicle detection method for detecting the presence or absence of a peripheral vehicle based on an image captured by an on-vehicle camera, comprising:

creating a luminance histogram of the captured image;

estimating and outputting an upper limit of a luminance value corresponding to the region of a vehicle bottom side of a peripheral vehicle by analyzing the luminance histogram of the image, the luminance value being a cumulative histogram value accumulated from a lower side of luminance of the luminance histogram that accounts for a predetermined percentage in a total number of pixels used for creating the luminance histogram as an upper limit for the luminance value, the percentage is calculated based on a ratio of the number of pixels assumed to include the vehicle bottom region on a condition that the peripheral vehicle to be detected is captured in the largest size in the image and to the total number of pixels used for creating the luminance histogram, and the threshold in the luminance histogram is adaptively determined, for the total number of pixels; and deciding a vehicle assumed region including the vehicle bottom having the luminance value not greater than the upper limit and determining whether or not the image of the vehicle assumed region corresponds to a vehicle by using a pattern matching method, the vehicle assumed region being a region assumed to include a vehicle bottom side having the luminance value not greater than the upper limit, wherein the vehicle assumed region is determined to correspond to the presence of the peripheral vehicle based on the vehicle assumed region pattern successfully pattern matching a shadow area at the bottom side of the peripheral vehicle;

extracting a road surface region from the captured image; and estimating and outputting an upper limit for the luminance value corresponding to the region of the vehicle bottom of a peripheral vehicle by analyzing the luminance histogram of the image created within the extracted road surface region.

5. The vehicle detection method as claimed in claim 4, further comprising:

extracting a low luminance pixel having the luminance value not greater than the upper limit from the captured image;

deciding the vehicle assumed region where the low luminance pixel is included in the vehicle bottom side based on the preset positional relationship between the vehicle bottom side and the vehicle region.

6. The vehicle detection method as claimed in claim 4, further comprising:

extracting a low luminance pixel having the luminance value not greater than the upper limit from the captured image;

extracting a partial region having a possibility of corresponding to a peripheral vehicle as the vehicle assumed region from the captured image; and verifying whether or not the low luminance pixel is included in the vehicle assumed region based on the luminance value not greater than the upper limit.

7. A non-transitory computer readable recording medium storing a vehicle detection program for causing a computer configuring a vehicle detection device for detecting the presence or absence of a peripheral vehicle based on an image captured by an on-vehicle camera to execute:

a function of creating a luminance histogram of the captured image;

a function of estimating and outputting an upper limit for a luminance value corresponding to the region of a vehicle bottom of a peripheral vehicle by analyzing the luminance histogram of the image created by the luminance creating unit, the luminance value being a cumulative histogram value accumulated from a lower side of luminance of the luminance histogram that accounts for a predetermined percentage in a total number of pixels used for creating the luminance histogram as an upper limit for the luminance value, the percentage is calculated based on a ratio of the number of pixels assumed to include the vehicle bottom region on a condition that the peripheral vehicle to be detected is captured in the largest size in the image and to the total number of pixels used for creating the luminance histogram, and the threshold in the luminance histogram is adaptively determined, for the total number of pixels; and a function of deciding a vehicle assumed region including the vehicle bottom side having the luminance value not greater than the upper limit and determining whether or not the image of the vehicle assumed region corresponds to a vehicle by using a pattern matching method, the vehicle assumed region being a region assumed to include a vehicle bottom side having the luminance value not greater than the upper limit, wherein the vehicle assumed region is determined to correspond to the presence of the peripheral vehicle based on the vehicle assumed region pattern successfully pattern matching a shadow area at the bottom side of the peripheral vehicle;

a function of extracting a road surface region from the captured image; and a function of estimating and outputting an upper limit for the luminance value corresponding to the region of a vehicle bottom of a peripheral vehicle by analyzing the luminance histogram of the image within the road surface region.

8. The non-transitory computer readable recording medium storing the vehicle detection program as claimed in claim 7, causing the computer to execute:

a function of extracting a low luminance pixel having the luminance value not greater than the upper limit from the captured image; and a function of deciding the vehicle assumed region where the low luminance pixel is included in the vehicle bottom side based on the preset positional relationship between the vehicle bottom side and the vehicle region.

9. The non-transitory computer readable recording medium storing the vehicle detection program as claimed in claim 7, causing the computer to execute:

a function of extracting a low luminance pixel having the luminance value not greater than the upper limit output by the luminance threshold specifying unit from the captured image;

a function of extracting a partial region having a possibility of corresponding to a peripheral vehicle as the vehicle assumed region from the captured image; and a function of verifying whether or not the low luminance pixel is included in the vehicle assumed region extracted by the vehicle assumed region extracting unit based on the luminance value not greater than the upper limit output by the low luminance pixel extracting unit.

* * * * *

UNITED STATES PATENT AND TRADEMARK OFFICE
CERTIFICATE OF CORRECTION

PATENT NO. : 8,599,257 B2
APPLICATION NO. : 12/373638
DATED : December 3, 2013
INVENTOR(S) : Katsuhiko Takahashi Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1208 days.

Signed and Sealed this
Twenty-second Day of September, 2015

Michelle K. Lee
*Director of the United States Patent and Trademark Office*